US012566259B2

(12) United States Patent
Jo et al.

(10) Patent No.:     US 12,566,259 B2
(45) Date of Patent:          Mar. 3, 2026

(54) IMAGE GENERATING DEVICE SETTING VIRTUAL TRANSMITTERS AND RECEIVERS, AND METHOD OF OPERATING THE SAME

(71) Applicant: ELECTRONICS AND TELECOMMUNICATIONS RESEARCH INSTITUTE, Daejeon (KR)

(72) Inventors: Sungwoo Jo, Daejeon (KR); Mugeon Kim, Daejeon (KR); Jungsoo Kim, Daejeon (KR); Kyung Hyun Park, Daejeon (KR); Il Min Lee, Daejeon (KR); Eui Su Lee, Daejeon (KR); Da Hye Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 285 days.

(21) Appl. No.: 18/480,795

(22) Filed: Oct. 4, 2023

(65) Prior Publication Data

US 2024/0134036 A1     Apr. 25, 2024

(30) Foreign Application Priority Data

Oct. 12, 2022     (KR) ........................ 10-2022-0130934
Aug. 23, 2023     (KR) ........................ 10-2023-0110847

(51) Int. Cl.
*G01S 13/89*          (2006.01)
*G01S 13/08*          (2006.01)
(52) U.S. Cl.
CPC .............. *G01S 13/89* (2013.01); *G01S 13/08* (2013.01)

(58) Field of Classification Search
CPC ...... G01S 15/8997; G01S 15/89; G01S 13/90; G01S 13/885; G01S 13/89; G01S 7/52046; G01S 17/90; G01S 17/89
(Continued)

(56) References Cited

U.S. PATENT DOCUMENTS 8,659,467 B1     2/2014  Chambers et al.
9,268,018 B2 *  2/2016  Ahmed ................. G01S 13/887
(Continued)

OTHER PUBLICATIONS

Zhuopeng Zhang et al., "Adaptive terahertz imaging using a virtual transceiver and coherence weighting," Optics Express, Sep. 28, 2009, vol. 17, No. 20.

*Primary Examiner* — Michael W Justice

(57)          ABSTRACT

Disclosed is an image generating device, which includes a measurement device including a plurality of transmitters and a plurality of receivers for a multistatic measurement of an object, an image preprocessing device that receives a raw image signal corresponding to the multistatic measurement from the measurement device and generates a preprocessed image signal based on the raw image signal, an image amplifier that generates an amplified image signal based on the preprocessed image signal, and an image restorer that generates a restored image signal corresponding to the object based on the amplified image signal, and the image amplifier is further configured to set up a first virtual transmitter and a first virtual receiver, to obtain first measurement data of a first target transmitter closest to the first virtual transmitter among the plurality of transmitters and a first target receiver closest to the first virtual receiver among the plurality of receivers.

15 Claims, 14 Drawing Sheets

(58) Field of Classification Search
USPC ........................................................ 342/22
See application file for complete search history.

(56)                     References Cited

U.S. PATENT DOCUMENTS

| | | | | |
|---|---|---|---|---|
| 10,091,492 | B2 * | 10/2018 | Dielacher | G01S 17/894 |
| 10,218,086 | B2 * | 2/2019 | Minami | H01Q 21/29 |
| 10,353,067 | B2 * | 7/2019 | Moulder | G01S 13/865 |
| 10,799,217 | B2 * | 10/2020 | Tsubota | A61B 8/5207 |
| 11,486,994 | B2 * | 11/2022 | Kishigami | G01S 7/4026 |
| 11,677,159 | B2 * | 6/2023 | Zhu | H01Q 21/28 |
| | | | | 342/25 A |
| 11,940,524 | B2 * | 3/2024 | Kishigami | G01S 13/42 |
| 12,313,766 | B2 * | 5/2025 | Küchler | G01S 13/82 |
| 2014/0125517 | A1 * | 5/2014 | Ahmed | G01S 13/904 |
| | | | | 342/25 A |
| 2015/0009485 | A1 * | 1/2015 | Mheen | G01S 7/4817 |
| | | | | 356/4.01 |
| 2016/0112696 | A1 * | 4/2016 | Dielacher | G01S 7/499 |
| | | | | 348/46 |
| 2016/0157828 | A1 * | 6/2016 | Sumi | G01N 29/46 |
| | | | | 702/189 |
| 2017/0149147 | A1 * | 5/2017 | Minami | G01S 7/03 |
| 2018/0310919 | A1 * | 11/2018 | Tsubota | A61B 8/5207 |
| 2019/0129026 | A1 | 5/2019 | Sumi et al. | |
| 2019/0324135 | A1 * | 10/2019 | Moulder | G01S 13/003 |
| 2020/0103515 | A1 * | 4/2020 | Kishigami | G01S 13/343 |
| 2021/0286069 | A1 * | 9/2021 | Kim | G01S 13/72 |
| 2023/0008565 | A1 * | 1/2023 | Kishigami | G01S 7/4026 |
| 2023/0080019 | A1 * | 3/2023 | Küchler | H04J 13/18 |
| | | | | 342/189 |
| 2023/0142169 | A1 * | 5/2023 | Lugitsch | G01S 13/878 |
| | | | | 342/192 |

* cited by examiner

IMAGE GENERATING DEVICE SETTING VIRTUAL TRANSMITTERS AND RECEIVERS, AND METHOD OF OPERATING THE SAME

CROSS-REFERENCE TO RELATED APPLICATIONS

This application claims priority under 35 U.S.C. § 119 to Korean Patent Application Nos. 10-2022-0130934 filed on Oct. 12, 2022, and 10-2023-0110847 filed on Aug. 23, 2023, respectively, in the Korean Intellectual Property Office, the disclosures of which are incorporated by reference herein in their entireties.

BACKGROUND

Embodiments of the present disclosure described herein relate to an image generating device, and more particularly, relate to an image generating device for setting virtual transmitters and virtual receivers and a method of operating the same.

In general, it is important for security systems used in security checkpoints, etc., to have the ability to identify various substances that make up an object in real time. A multistatic measurement method is harmless to the human body and has the ability to distinguish various substances, including non-metals, so it is widely used in security systems.

However, in the multistatic measurement method, a plurality of transmitters and a plurality of receivers are used. When the plurality of transmitters and the plurality of receivers are respectively arranged at wide intervals, noise and ghosting may occur in the restored image of objects due to insufficient information. In contrast, when the plurality of transmitters and the plurality of receivers are respectively arranged at narrow intervals, the number of required transmitters and receivers increases, resulting in an increase in production cost.

SUMMARY

Embodiments of the present disclosure provide an image generating device and method for setting virtual transmitters and receivers.

According to an embodiment of the present disclosure, an image generating device includes a measurement device including a plurality of transmitters and a plurality of receivers for a multistatic measurement of an object, an image preprocessing device that receives a raw image signal corresponding to the multistatic measurement from the measurement device and generates a preprocessed image signal based on the raw image signal, an image amplifier that generates an amplified image signal based on the preprocessed image signal, and an image restorer that generates a restored image signal corresponding to the object based on the amplified image signal, and the image amplifier is further configured to set up a first virtual transmitter and a first virtual receiver, to obtain first measurement data of a first target transmitter closest to the first virtual transmitter among the plurality of transmitters and a first target receiver closest to the first virtual receiver among the plurality of receivers from the preprocessed image signal, to generate first virtual measurement data of the first virtual transmitter and the first virtual receiver based on a first operation of the first measurement data and first correction data, and to generate the amplified image signal based on a synthesis of the preprocessed image signal and the first virtual measurement data.

According to an embodiment, the image amplifier may be further configured to set up a second virtual transmitter and a second virtual receiver, to obtain second measurement data of a second target transmitter closest to the second virtual transmitter among the plurality of transmitters and a second target receiver closest to the second virtual receiver among the plurality of receivers from the preprocessed image signal, to generate second virtual measurement data of the second virtual transmitter and the second virtual receiver based on a second operation of the second measurement data and second correction data, and to generate the amplified image signal based on a synthesis of the preprocessed image signal, the first virtual measurement data, and the second virtual measurement data.

According to an embodiment, the image amplifier is further configured to generate first distance data based on distances between a target point within the object and each of the first target transmitter and receiver, generate second distance data based on distances between the target point within the object and each of the first virtual transmitter and receiver, generate the first correction data based on a comparison operation of the first distance data and the second distance data, and generate the first virtual measurement data based on a product of the first measurement data and the first correction data, and wherein the first distance data includes a first transmitter distance indicating a distance between the first target transmitter and the target point, and a first receiver distance indicating a distance between the first target receiver and the target point, and wherein the second distance data includes a second transmitter distance indicating a distance between the first virtual transmitter and the target point, and a second receiver distance indicating a distance between the first virtual receiver and the target point.

According to an embodiment, the target point within the object may be a center of a cross section of the object corresponding a target height.

According to an embodiment, the image amplifier may be further configured to generate the first correction data based on equation $$\frac{e^{-ikL_{VT}} \times e^{-ikL_{VR}}}{e^{-ikL_T} \times e^{-ikL_R}},$$

and where $L_T$ may indicate the first transmitter distance, $L_R$ may indicate the first receiver distance, $L_{VT}$ may indicate the second transmitter distance, and $L_{VR}$ may indicate the second receiver distance.

According to an embodiment, the measurement device may be further configured to generate the raw image signal using a signal of a terahertz wave.

According to an embodiment, the plurality of transmitters among may be arranged at intervals of $\frac{1}{4}^{\bar{\lambda}}$ to $1^{\bar{\lambda}}$, the plurality of receivers among may be arranged at intervals of $\frac{1}{4}^{\bar{\lambda}}$ to 1 $\bar{\lambda}$, and the $\bar{\lambda}$ may be a wavelength of the terahertz wave.

According to an embodiment, the image preprocessing device may be further configured to remove noise from the raw image signal or to realign the raw image signal.

According to an embodiment, the restored image signal may be a 3D (3-dimensional) image signal.

According to an embodiment of the present disclosure, a method of operating an image generating device including a measurement device, an image preprocessing device, an image amplifier, and an image restorer, includes generating, by the measurement device, a raw image signal corresponding to a multistatic measurement of an object, generating, by the image preprocessing device, a preprocessed image signal based on the raw image signal, setting up, by the image amplifier, a first virtual transmitter and a first virtual receiver, obtaining, by the image amplifier, first measurement data of a first target transmitter closest to the first virtual transmitter among a plurality transmitters of the measurement device and a first target receiver closest to the first virtual receiver among a plurality of receivers of the measurement device from the preprocessed image signal, generating, by the image amplifier, first virtual measurement data of the first virtual transmitter and the first virtual receiver based on a first operation of the first measurement data and first correction data, generating, by the image amplifier, an amplified image signal based on a synthesis of the preprocessed image signal and the first virtual measurement data, and generating, by the image restorer, a restored image signal corresponding to the object based on the amplified image signal.

According to an embodiment, the setting up, by the image amplifier, of the first virtual transmitter and the first virtual receiver further includes setting up a second virtual transmitter and the second virtual receiver, the obtaining, by the image amplifier, of the first measurement data of the first target transmitter closest to the first virtual transmitter among the plurality of transmitters of the measurement device and the first target receiver closest to the first virtual receiver among the plurality of receivers of the measurement device from the preprocessed image signal further includes obtaining second measurement data of second target transmitter closes to the second transmitter among the plurality of transmitters of the measurement device and second target receiver closest to the second virtual receiver among the plurality of receivers of the measurement device from the preprocessed image signal, the generating, by the image amplifier, of the first virtual measurement data of the first virtual transmitter and the first virtual receiver based on the first operation of the first measurement data and the first correction data further includes generating second virtual measurement data of the second virtual transmitter and the second virtual receive based on a second operation of the second measurement data and second correction data, and wherein the generating, by the image amplifier, of the amplified image signal based on the synthesis of the preprocessed image signal and the first virtual measurement data includes generating a first synthesis image signal based on the synthesis of the preprocessed image signal and the first virtual measurement data, generating a second synthesis image signal based on a synthesis of the first synthesis image signal and the second virtual measurement data, and providing the second synthesis image signal as the amplified image signal to the image restorer.

According to an embodiment, the generating, by the image amplifier, of the virtual measurement data of the first virtual transmitter and the first virtual receive based on the first operation of the first measurement data and the first correction data includes generating first distance data based on distances between a target point within the object and each of the first target transmitter and the first target receiver, generating second distance data based on distances between the target point within the object and each of the first virtual transmitter and the first virtual receiver, generating the first correction data based on a comparison operation of the first distance data and the second distance data, and generating the first virtual measurement data based on a product of the first measurement data and the first correction data, and the first distance data includes a first transmitter distance indicating a distance between the first target transmitter and the target point, and a first receiver distance indicating a distance between the first target receiver and the target point, and the second distance data includes a second transmitter distance indicating a distance between the first virtual transmitter and the target point, and a second receiver distance indicating a distance between the first virtual receiver and the target point.

According to an embodiment, the target point within the object may be a center of a cross section of the object corresponding a target height.

According to an embodiment, the comparison operation may indicate equation $$\frac{e^{-ikL_{VT}} \times e^{-ikL_{VR}}}{e^{-ikL_T} \times e^{-ikL_R}},$$

and where $L_T$ may indicate the first transmitter distance, $L_R$ may indicate the first receiver distance, $L_{VT}$ may indicate the second transmitter distance, and $L_{VR}$ may indicate the second receiver distance.

According to an embodiment, the generating, by the measurement device, of the raw image signal corresponding to the multistatic measurement of the object may include providing, by a plurality of transmitters of the measurement device, a signal of a terahertz wave to the object, receiving, by a plurality of receivers of the measurement device, an echo signal corresponding to the signal of the terahertz wave from the object, and generating the raw image signal based on the signal of the terahertz wave and the echo signal.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail such that those skilled in the art may easily carry out the present disclosure.

In the description below, the terms "block", "unit", "module", etc. or components corresponding to the terms may be implemented in the form of software, hardware, or a combination thereof. Hereinafter, to describe the technical idea of the present disclosure clearly, a description associated with identical components will be omitted to avoid redundancy.

Figure 1:
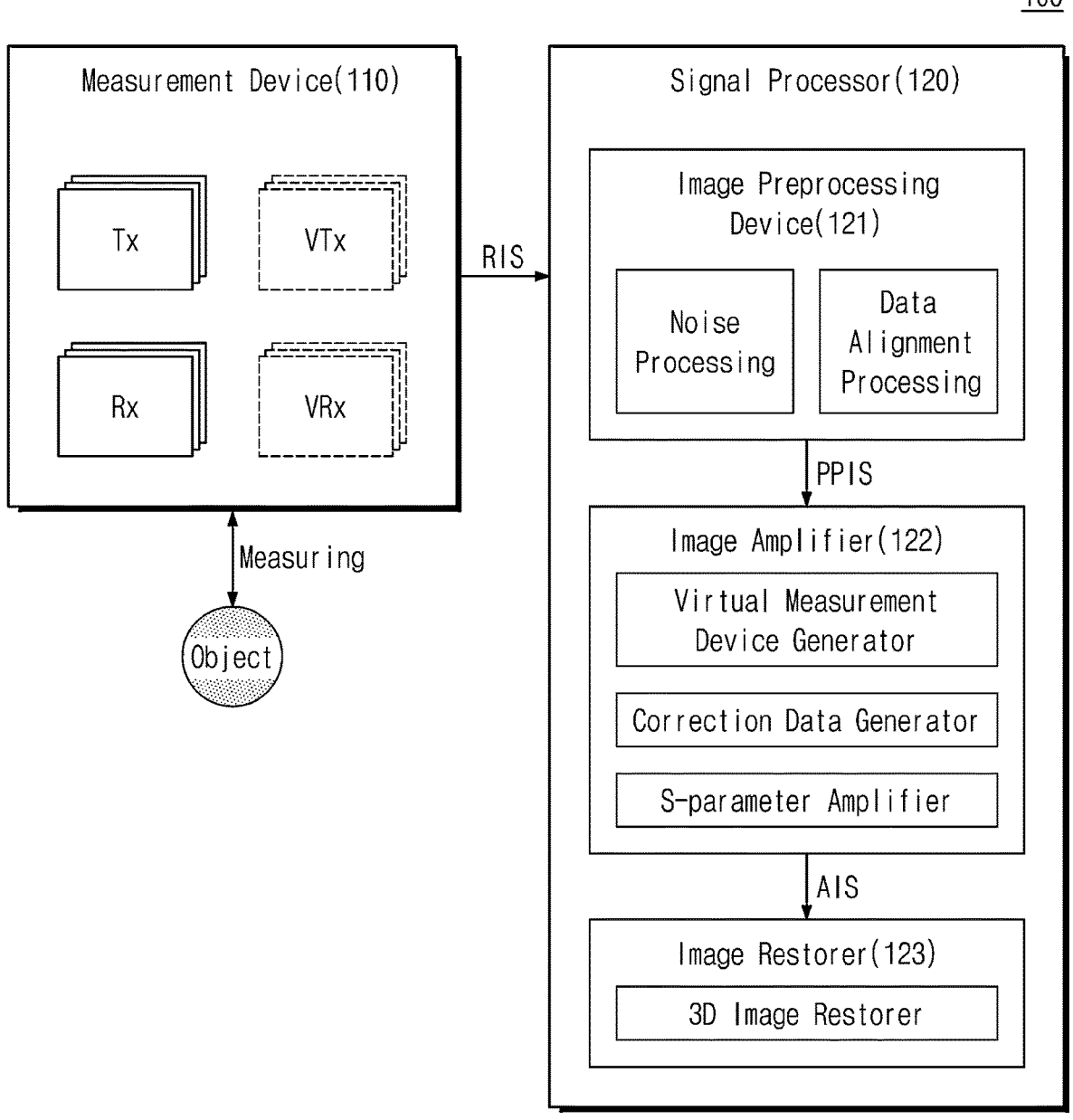
FIG. 1 is a block diagram illustrating an image generating device according to the present disclosure.

FIG. 1 is a block diagram illustrating an image generating device according to the present disclosure. Referring to FIG. 1, an image generating device 100 is illustrated.

The image generating device 100 may perform a multistatic measurement on an object and may generate a restored image signal corresponding to the object. The multistatic measurement may generate electrical signals corresponding to the object using a plurality of transmitters and a plurality of receivers disposed at different locations. For example, the electrical signals may correspond to a location of the object, internal and external shapes of the object, a type of material that makes up the object, etc.

The restored image signal may include image data corresponding to the object. For example, the restored image signal may include image data representing one cross section of the object. As another example, the restored image signal may include 3-dimensional (3D) image data corresponding to the internal and external shapes, the location, and constituent materials of the object. In detail, a color of the restored image signal may vary depending on the type and density of the material constituting the object.

The image generating device 100 may include a measurement device 110 and a signal processor 120.

The measurement device 110 may include a plurality of transmitters and a plurality of receivers Tx and Rx for a multistatic measurement of an object. The measurement device 110 may generate a raw image signal RIS through the multistatic measurement of the object.

In some embodiments, the measurement device 110 may generate the raw image signal RIS using a signal of a terahertz wave.

For example, among the plurality of transmitters Tx and the plurality of receivers Rx of the measurement device 110, each of the transmitters Tx may transmit the terahertz wave signal to the object. Among the plurality of transmitters Tx and the plurality of receivers Rx, each of the plurality of receivers Rx may receive the corresponding terahertz wave signal passing through the object as an echo signal.

In some embodiments, the plurality of transmitters Tx and the plurality of receivers Rx of the measurement device 110 may perform measurement individually or simultaneously.

In some embodiments, the plurality of transmitters Tx may be arranged at intervals of $\frac{1}{4}^{\overline{\lambda}}$ to $1^{\overline{\lambda}}$. In addition, the plurality of receivers Rx may be arranged at intervals of $\frac{1}{4}$ $\overline{\lambda}$ to $1^{\overline{\lambda}}$. In this case, $\overline{\lambda}$ may be a wavelength of the terahertz wave.

The measurement device 110 may generate the raw image signal RIS based on the terahertz wave signals transmitted by the plurality of transmitters Tx and the echo signals measured by the plurality of receivers Rx. The echo signals may refer to signals that are received by the plurality of receivers Rx after the terahertz wave signals transmitted from the plurality of transmitters Tx are reflected from the object. The echo signals may also be referred to as S-parameters. The raw image signal RIS may be a set of the S-parameters corresponding to the plurality of transmitters and the plurality of receivers Tx and Rx.

The measurement device 110 may provide the raw image signal RIS to the signal processor 120.

The signal processor 120 may generate the restored image signal corresponding to the object based on the raw image signal RIS. The signal processor 120 may include an image preprocessing device 121, an image amplifier 122, and an image restorer 123.

The image preprocessing device 121 may receive the raw image signal RIS from the measurement device 110. The image preprocessing device 121 may generate a preprocessed image signal PPIS based on the raw image signal RIS. For example, the image preprocessing device 121 may generate the preprocessed image signal PPIS by performing a preprocessing operation on the raw image signal RIS.

In detail, the image preprocessing device 121 may include noise processing and data alignment processing. Some or all of noise of the raw image signal RIS may be removed by the noise processing, and some or all of the raw image signal RIS may be realigned by the data alignment processing.

Accordingly, the preprocessed image signal PPIS may indicate a set of S-parameters with noise reduced and realigned. In this case, each of the noise-reduced and realigned S-parameters may be referred to as measurement data of the corresponding transmitter and receiver among the plurality of transmitters and the plurality of receivers.

The image preprocessing device 121 may provide the preprocessed image signal PPIS to the image amplifier 122.

The image amplifier 122 may generate an amplified image signal AIS based on the preprocessed image signal PPIS. The amplified image signal AIS may refer to amplified measurement data. In detail, a method by which the image amplifier 122 generates the amplified image signal AIS will be described later.

The image amplifier 122 may include a virtual measurement device generator, a correction data generator, and an S-parameter amplifier.

The virtual measurement device generator may set up arbitrary virtual transmitters VTx and virtual receivers VRx. For example, the virtual measurement device generator may set up first to N-th virtual transmitter and receiver. In this case, 'N' is any natural number.

The virtual measurement device generator may set each of the plurality of virtual transmitters VTx and virtual receivers VRx to be placed in a different location from the plurality of transmitters and the plurality of receivers Tx and Rx. In detail, the virtual measurement device generator may assume the locations of the plurality of virtual transmitters VTx and virtual receivers VRx (e.g., relative locations or coordinates with the plurality of transmitters Tx and the plurality of receivers Rx).

For example, in the case of the virtual transmitter VTx, the virtual transmitter VTx may be set between two transmitters Tx. As another example, the virtual transmitter VTx may be set at both ends of the plurality of transmitters Tx.

Likewise, for example, in the case of the virtual receiver VRx, the virtual receiver VRx may be set between two receivers Rx. As another example, a virtual receiver VRx may be set at both ends of the plurality of receivers Rx.

Although the measurement device 110 is illustrated as including the plurality of transmitters Tx and the plurality of receivers Rx and the plurality of virtual transmitters VTx and the plurality of virtual receivers VRx, but in actually, the measurement device 110 only includes the plurality of transmitters and the plurality of receivers Tx and Rx, and does not include the plurality of virtual transmitters VTx and receivers VRx.

The correction data generator may generate correction data based on distance data of the plurality of transmitters and the plurality of receivers Tx and Rx and distance data of the plurality of virtual transmitters VTx and receivers VRx. The distance data may indicate the distance from a target point within the object.

The correction data generator may receive distance data of the plurality of transmitters and the plurality of receivers Tx and Rx from an internal memory device of the image generating device 100. The correction data generator may receive the distance data of the plurality of virtual transmitters VTx and receivers VRx from the virtual measurement device generator.

A more detailed description of the distance data and correction data will be described later with reference to FIG. 2.

The correction data generator may generate N pieces of correction data when there are N plurality of virtual transmitters VTx and receivers VRx. In this case, 'N' is a natural number. In detail, the correction data generator may generate first correction data corresponding to the first virtual transmitter and the first virtual receiver, second correction data corresponding to the second virtual transmitter and the second virtual receiver. The detailed process by which the correction data generator generates correction data will be described later with reference to FIG. 2.

The S-parameter amplifier may receive the preprocessed image signal PPIS from the image preprocessing device 121. In detail, the S-parameter amplifier may obtain the measurement data corresponding to each of the plurality of transmitters and the plurality of receivers Tx and Rx.

The S-parameter amplifier may obtain the measurement data corresponding to a target transmitter closest to the virtual transmitter VTx among the plurality of transmitters Tx and to a target receiver closest to the virtual receiver VRx among the plurality of receivers Rx.

The S-parameter amplifier may generate virtual measurement data based on an operation of the measurement data of the target transmitter and receiver and the correction data. A more detailed description of the virtual measurement data will be described later with reference to FIG. 2.

The S-parameter amplifier may generate the amplified image signal AIS based on a synthesis of measurement data and the virtual measurement data. In detail, the S-parameter amplifier may generate the amplified image signal AIS that includes both the measurement data generated from the plurality of transmitters and the plurality of receivers Tx and Rx and the virtual measurement data calculated by setting the plurality of virtual transmitters VTx and virtual receivers VRx. The S-parameter amplifier may provide the amplified image signal AIS to the image restorer 123.

The image restorer 123 may be configured to generate the restored image signal corresponding to the object based on the amplified image signal AIS. For example, the restored image signal may refer to a 2-dimensional (2D) image representing a specific cross-section of the object.

The image restorer 123 may include a 3D image restorer. The 3D image restorer may generate a 3D image corresponding to the object. For example, the 3D image restorer may generate the 3D image corresponding to the object by synthesizing 2D images corresponding to cross sections of the object.

The image restorer 123 may visually display the image corresponding to the object to a user through a separate interface device (e.g., although not illustrated in FIG. 1, a display device, hologram device, etc.) based on the restored image signal.

In the restored image signal generated by the image generating device 100 according to the present disclosure, noise and ghosts may occur at a similar level to the restored image signal generated by a general image generating device that actually additionally places a plurality of transmitters and a plurality of receivers in locations where the plurality of virtual transmitters VTx and a plurality of receivers VRx are set. In detail, the image generating device 100 according to the present disclosure may have similar performance to a general image generating device in which a plurality of transmitters and a plurality of receivers are additionally disposed.

Figure 2:
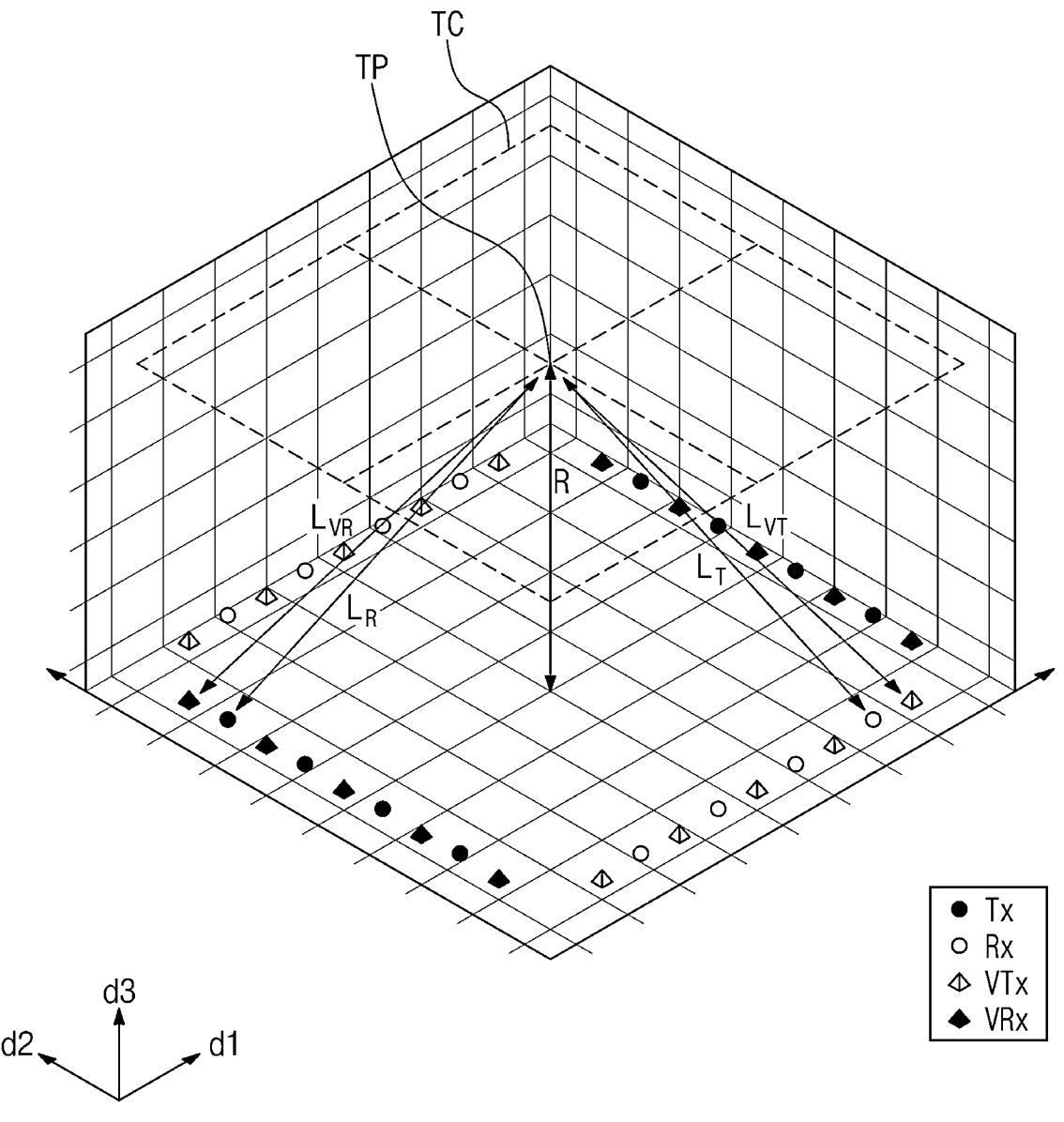
FIG. 2 is a diagram describing virtual transmitters and receivers according to the present disclosure.

FIG. 2 is a diagram describing virtual transmitters and virtual receivers according to the present disclosure. Referring to FIG. 2, virtual transmitters and virtual receivers set by the virtual measurement device generator of FIG. 1, a method by which the correction data generator generates correction data, and a method by which the S-parameter amplifier generates virtual amplification data are described.

Although not illustrated, an object subject to multistatic measurement may be located in a three-dimensional space having a first direction d1, a second direction d2, and a third direction d3. The first direction d1, the second direction d2, and the third direction d3 may be perpendicular to each other.

In the three-dimensional space where the object is located, the plurality of transmitters and the plurality of receivers Tx and Rx may be placed outside the object. For example, the plurality of transmitters Tx may be arranged in parallel in the first direction d1. The plurality of receivers Rx may be arranged in parallel in the second direction d2.

The virtual measurement device generator may set up the virtual transmitters VTx between the plurality of transmitters Tx. For example, one virtual transmitter VTx may be set between two transmitters Tx placed in parallel. Likewise, the virtual measurement device generator may set up virtual receivers VRx between the plurality of receivers Rx. For example, one virtual receiver VRx may be set up between two receivers Rx arranged in parallel.

The correction data generator may generate the first correction data corresponding to the first virtual transmitter VTx1 and the first virtual receiver VRx1. The correction data generator may determine target transmitter Tx_T and target receiver Rx_T that are respectively closest to the first virtual transmitter VTx1 and the first virtual receiver VRx1.

The correction data generator may generate first distance data based on the distance between the target transmitter Tx_T and target receiver Rx_T and the target point TP within the object.

In some embodiments, the target point TP may indicate a center of the cross section of the object corresponding to a target height within the object. For example, the target height may be a distance R in the third direction d3. In this case, 'R' is a real number. The cross section of the object corresponding to the target height may indicate a cross section perpendicular to the third direction d3. The cross section of the object corresponding to the target height may be referred to as a target cross section TC.

In some embodiments, the first distance data may include a first transmitter distance $L_T$ and a first receiver distance $L_R$. The first transmitter distance $L_T$ may indicate the distance between the target transmitter Tx_T and the target point TP. The first receiver distance $L_R$ may indicate the distance between the target receiver Rx_T and the target point TP.

In some embodiments, the second distance data may include a second transmitter distance $L_{VT}$ and a second receiver distance $L_{VR}$. The second transmitter distance $L_{VT}$ may indicate the distance between the first virtual transmitter VTx1 and the target point TP. The second receiver distance $L_{VR}$ may indicate the distance between the first virtual receiver VRx1 and the target point TP.

In some embodiments, the correction data generator may generate the first correction data based on a comparison operation of first distance data and second distance data.

In some embodiments, the correction data generator is further configured to generate first correction data based on equation $$\frac{e^{-ikL_{VT}} \times e^{-ikL_{VR}}}{e^{-ikL_T} \times e^{-ikL_R}},$$

and where $L_T$ indicates the first transmitter distance, $L_R$ indicates the first receiver distance, $L_{VT}$ indicates the second transmitter distance, and $L_{VR}$ indicates the second receiver distance.

As in the above description, the correction data generator may generate first to N-th correction data for each of the second to N-th virtual transmitters and receivers.

The S-parameter amplifier may obtain first measurement data corresponding to the target transmitter Tx_T and target receiver Rx_T from the preprocessed image signal. The S-parameter amplifier may generate first virtual measurement data based on an operation of the first measurement data and first correction data.

In some embodiments, the S-parameter amplifier may generate the first virtual measurement data by multiplying the first measurement data by the first correction data. As in the above description, the S-parameter amplifier may generate second to N-th virtual measurement data corresponding to the second to N-th virtual transmitters and receivers.

The S-parameter amplifier may generate the amplified image signal based on the synthesis of the preprocessed image signal and the first virtual measurement data. In detail, the S-parameter amplifier may generate a first synthesized image signal by synthesizing the preprocessed image signal and the first virtual measurement data. The S-parameter amplifier may generate the amplified image signal by synthesizing the second to N-th virtual measurement data separately or simultaneously with the first synthesized image signal.

Figure 3:
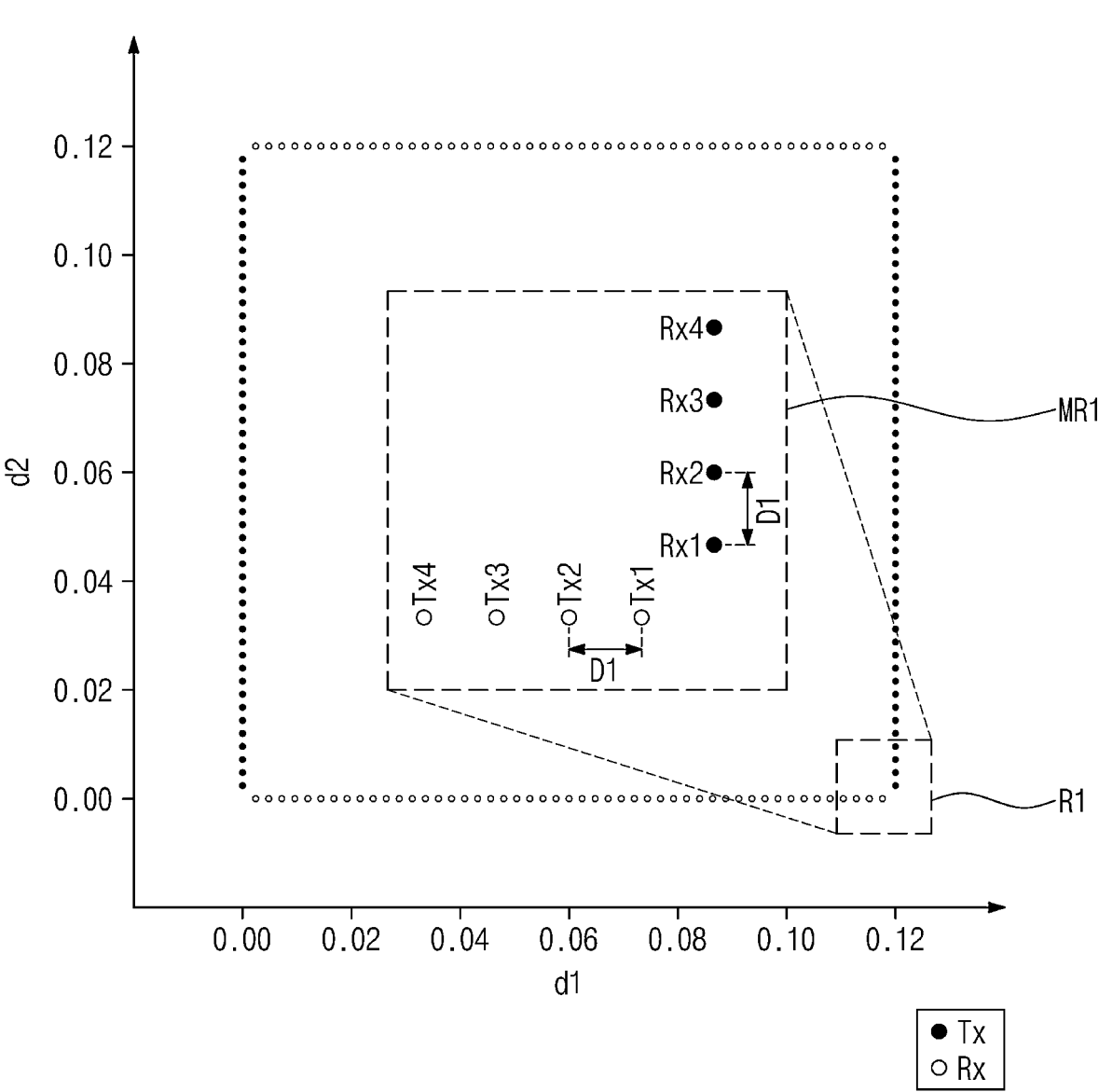
FIG. 3 is a block diagram describing general transmitters and receivers arranged in full size.
Figure 4:
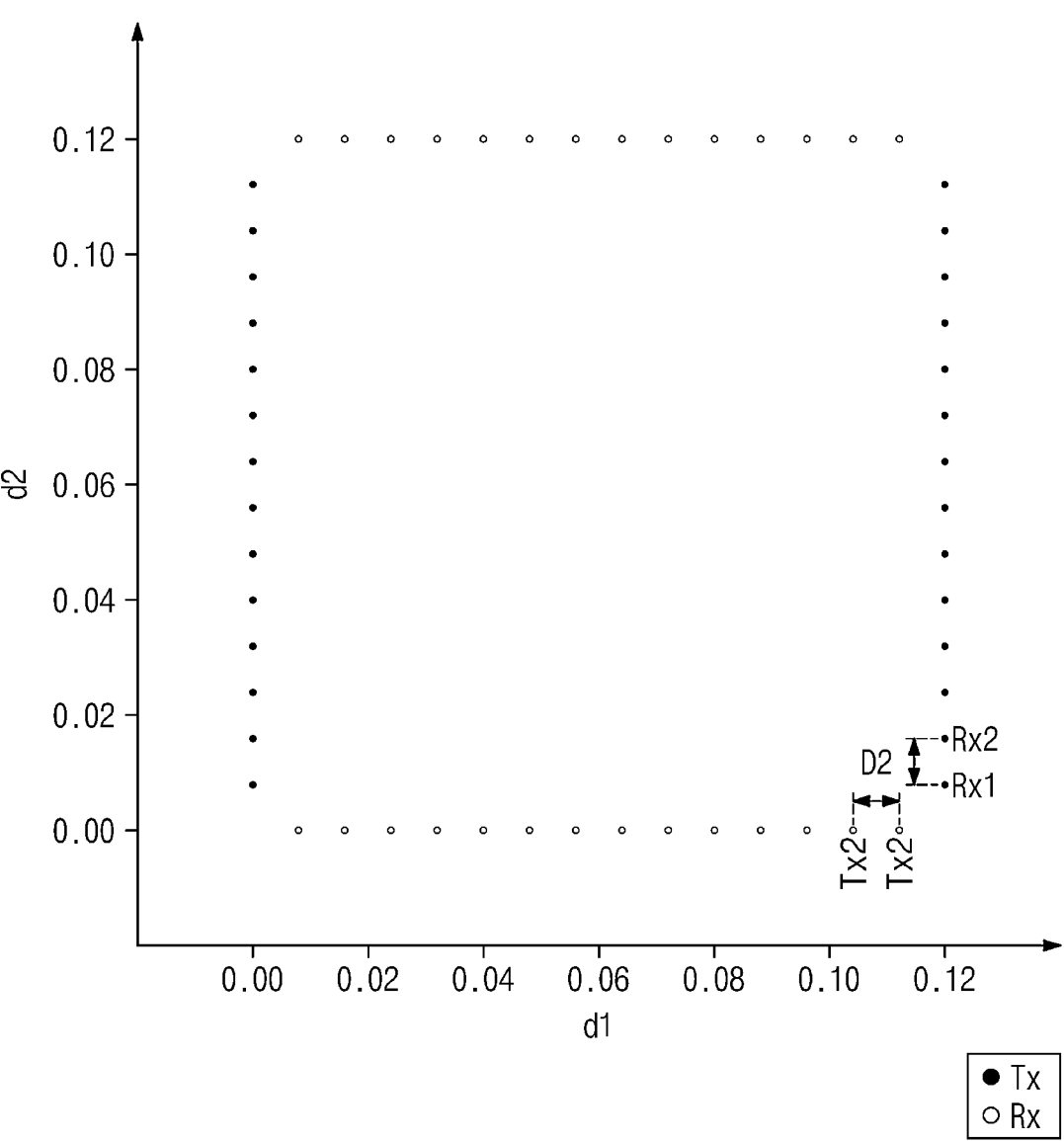
FIG. 4 is a diagram describing general transmitters and receivers arranged sparsely.

FIGS. 3 and 4 are diagrams describing a general measurement device. Referring to FIGS. 3 and 4, a measurement device including general transmitters and receivers arranged in full size and a measurement device including general transmitters and receivers arranged sparsely are described. The first direction d1 and the second direction d2 in FIGS. 3 and 4 may correspond to the first direction d1 and the second direction d2 in FIG. 2, respectively.

First, referring to FIG. 3, among general transmitters and receivers arranged in full size, the transmitters Tx may be arranged at uniform intervals from each other in the first direction d1. For example, although not entirely illustrated, the first to N1-th transmitters Tx1 to TxN1 may be arranged in parallel at a first interval in the first direction d1.

Among the general transmitters and receivers arranged in the full size of FIG. 3, the receivers Rx may be arranged at uniform intervals from each other in the second direction d2. For example, the first to N1-th receivers Rx1 to RxN may be arranged in parallel at the first interval in the second direction d2.

In detail, referring to a first enlarged area MR1 obtained by enlarging the first area R1, the first to fourth transmitters Tx1 to Tx4 may be arranged at the first interval in the first direction d1. In addition, the first to fourth receivers Rx1 to Rx4 may be arranged at the first interval in the second direction d2.

Referring to FIG. 4, among general transmitters and receivers in a sparse arrangement, the transmitters Tx may be arranged at uniform intervals from each other in the first direction d1. For example, although not entirely illustrated, the first to N1-th transmitters Tx1 to TxN1 may be arranged in parallel at a second interval in the first direction d1.

Among the general transmitters and receivers arranged in the full size of FIG. 4, the receivers Rx may be arranged at uniform intervals from each other in the second direction d2. For example, the first to N1-th receivers Rx1 to RxN may be arranged in parallel at the second interval in the second direction d2. In this case, the second interval may be larger than the first interval.

In detail, a measurement device that includes sparsely arranged transmitters and receivers may include fewer transmitters and receivers than a measurement device that includes full-size arranged transmitters and receivers. However, when the measurement device including sparsely arranged transmitters and receivers is used, noise in the restored image signal may increase and a ghost phenomenon may occur compared to the measurement device including the full-size arranged transmitters and receivers.

Figure 5:
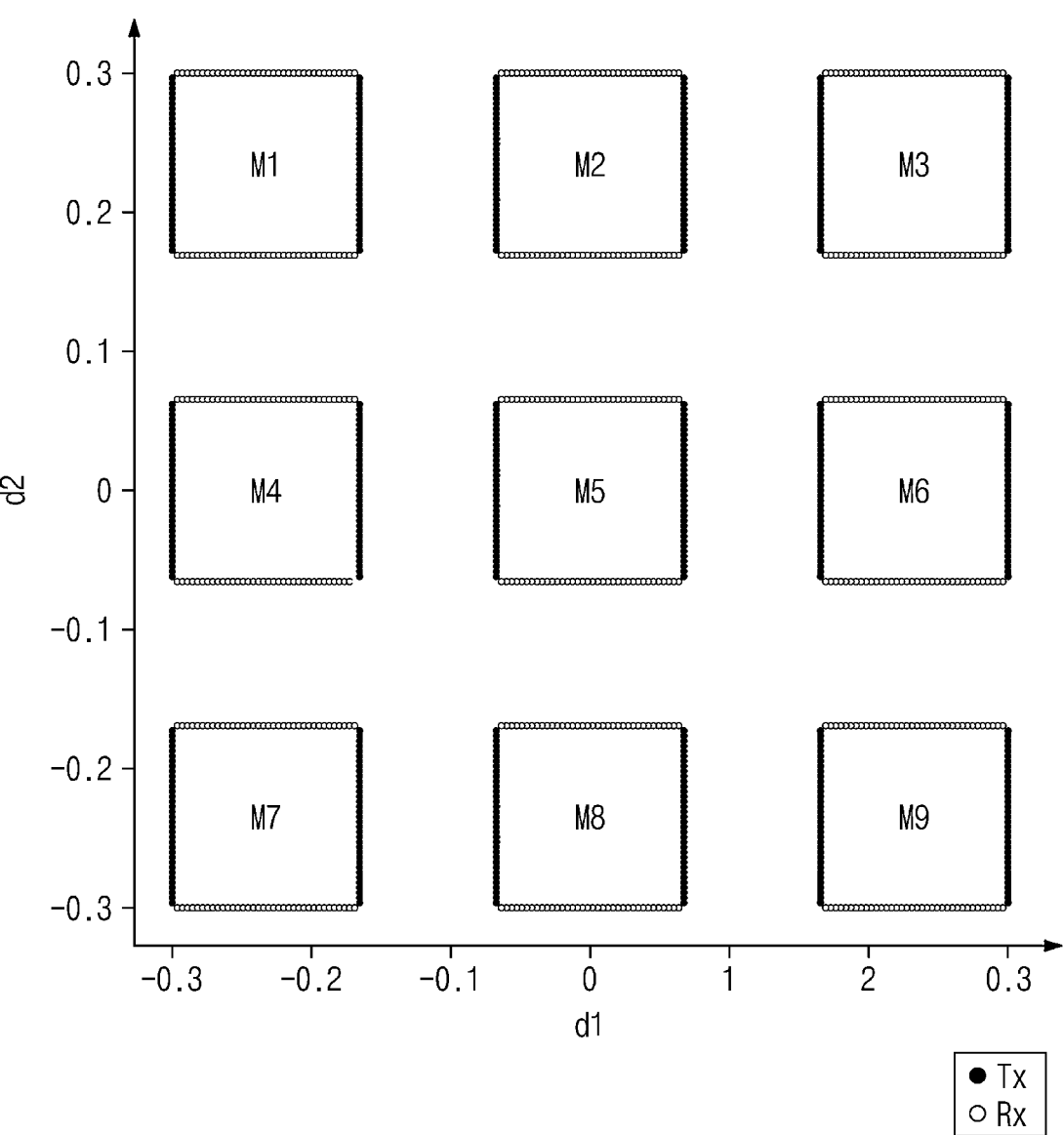
FIG. 5 is a block diagram describing general transmitters and receivers arranged in full size.
Figure 6:
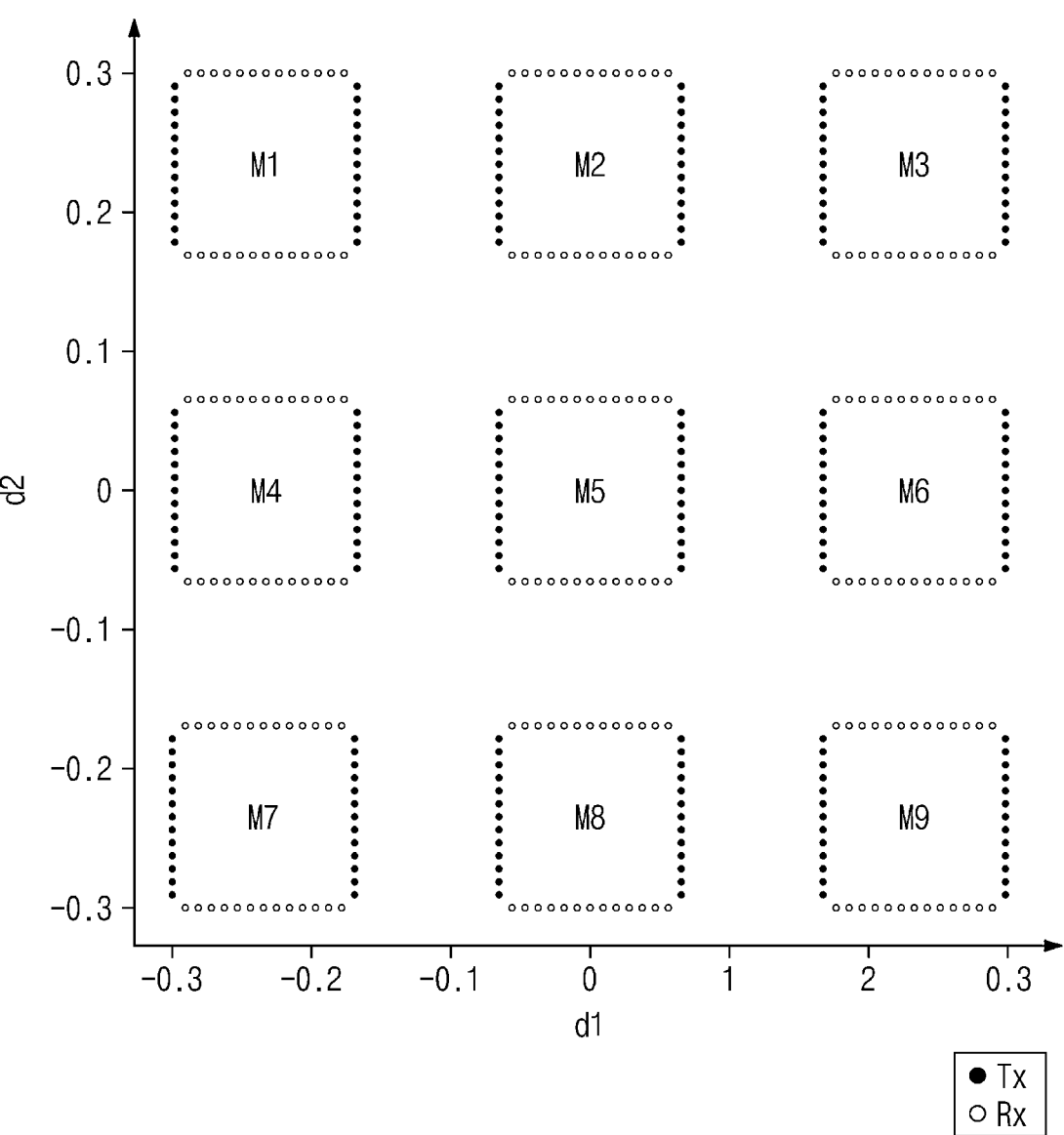
FIG. 6 is a diagram describing general transmitters and receivers arranged sparsely.

FIGS. 5 and 6 are diagrams describing a general measurement device used in an image generating system. Referring to FIGS. 5 and 6, a measurement device including full-size arranged general transmitters and receivers and a measurement device including sparsely arranged general transmitters and receivers used in an image generating system are illustrated. The first direction d1 and the second direction d2 in FIGS. 5 and 6 may correspond to the first direction d1 and the second direction d2 in FIG. 2, respectively.

The measurement devices of FIGS. 5 and 6 may include a plurality of measurement modules. For example, the measurement device of FIGS. 5 and 6 may include first to ninth measurement modules M1 to M9. Each of the first to ninth measurement modules M1 to M9 may be composed of the plurality of transmitters and the plurality of receivers illustrated in FIGS. 3, and 4.

For example, the first measurement module M1 of FIG. 5 may have the plurality of transmitters arranged at the first intervals in the first direction d1 and the plurality of receivers arranged at the first intervals in the second direction d2.

Likewise, the first measurement module M1 of FIG. 6 may have the plurality of transmitters arranged at the second intervals in the first direction d1 and the plurality of receivers arranged at the second intervals in the second direction d2. In this case, the second interval is greater than the first interval.

Figure 7:
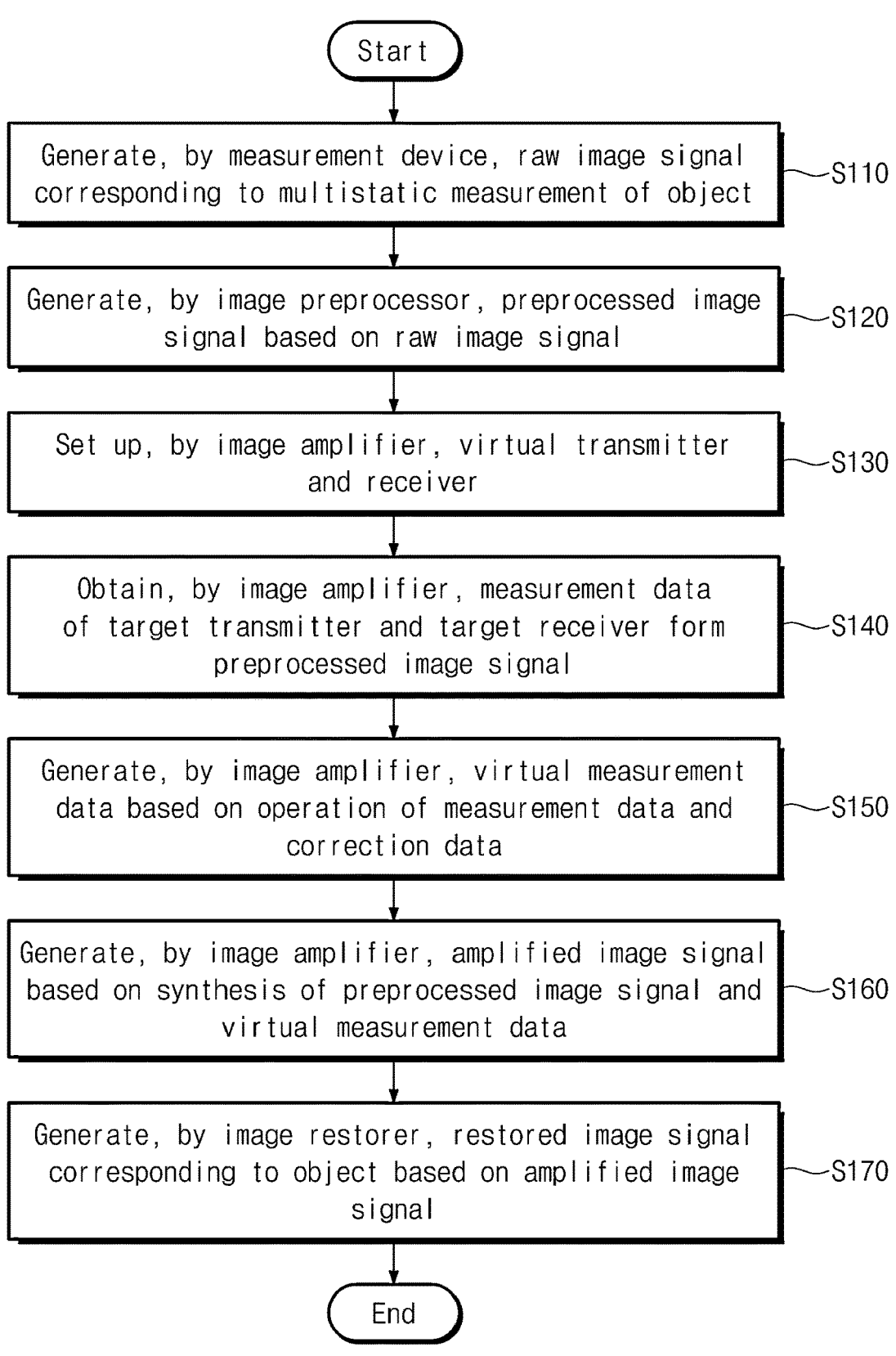
FIG. 7 is a flowchart illustrating a method of operating an image generating device according to the present disclosure.

FIG. 7 is a flowchart illustrating a method of operating an image generating device according to the present disclosure. Referring to FIG. 7, a method of operating the image generating device 100 of FIG. 1 will be described.

In operation S110, the image generating device may generate the raw image signal corresponding to the multi-static measurement of the object, by using the measurement device.

In some embodiments, operation S110 may include providing the terahertz wave signal to the object, by the plurality of transmitters of the measurement device, receiving the echo corresponding to the terahertz wave signal from the object, by the plurality of receivers of the measurement device, and generating the raw image signal based on the terahertz wave signal and the echo signal.

In operation S120, the image generating device may generate the preprocessed image signal based on the raw image signal, by using the image preprocessing device.

In some embodiments, the image preprocessing device may remove noise from the raw image signal or may perform data realignment operation of the image signal to generate the preprocessed image signal.

In operation S130, the image generating device may set up the virtual transmitter and receiver, by using the image amplifier.

In operation S140, the image generating device may obtain measurement data of the target transmitter and target receiver respectively closest to the virtual transmitter and the virtual receiver from the preprocessed image signal, by using the image amplifier.

In operation S150, the image generating device may generate the virtual measurement data based on an operation of the measurement data and the correction data, by using the image amplifier.

In operation S160, the image generating device may generate the amplified image signal based on a synthesis of the preprocessed image signal and the virtual measurement data, by using the image amplifier.

In operation S170, the image generating device may generate the restored image signal corresponding to the object based on the amplified image signal, by using the image restorer.

Figure 8:
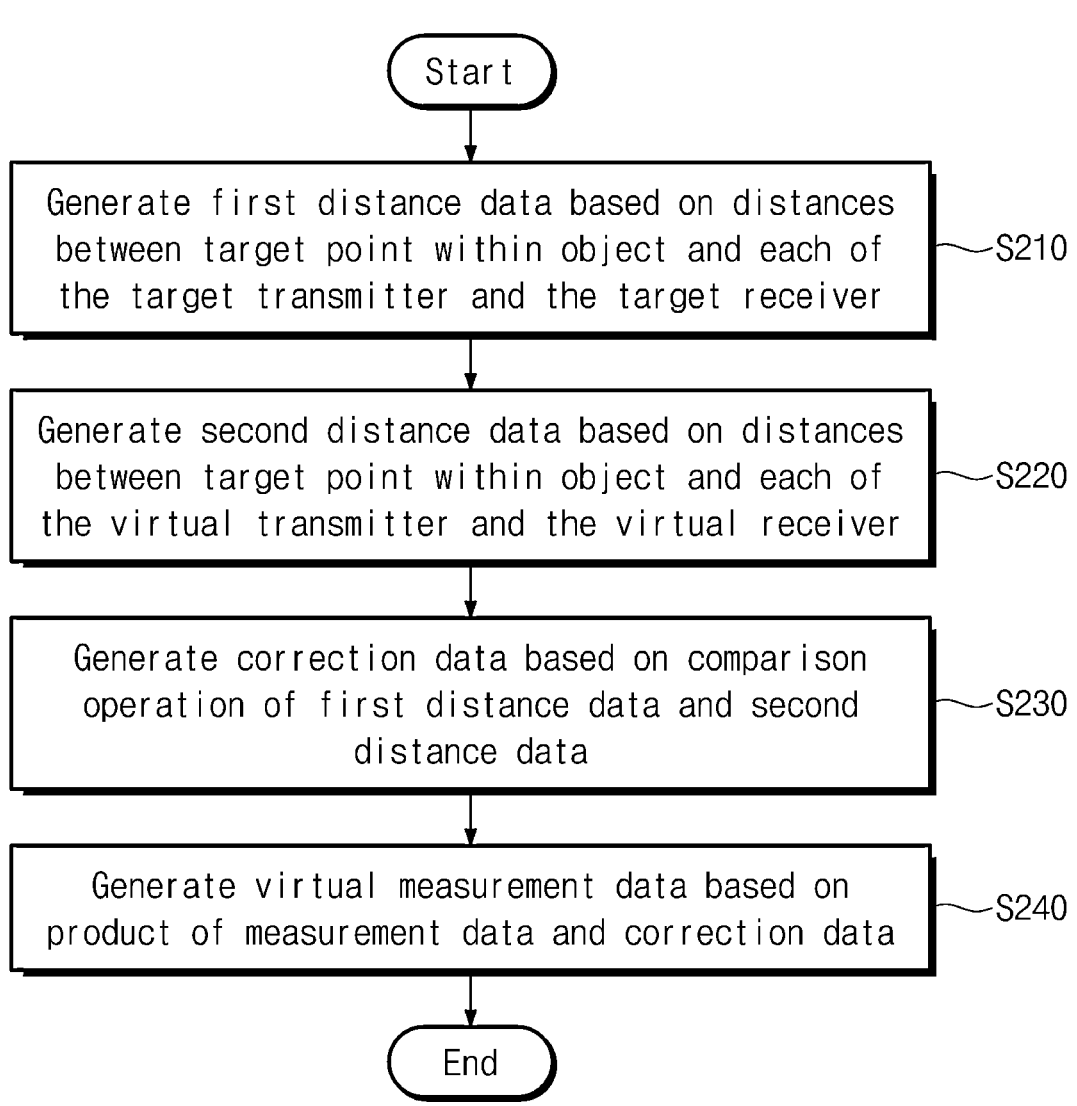
FIG. 8 is a flowchart illustrating how an image generating device according to the present disclosure generates virtual measurement data.

FIG. 8 is a flowchart illustrating how an image generating device according to the present disclosure generates virtual measurement data. Referring to FIG. 8, a method by which an image generating device generates virtual measurement data will be described.

In operation S210, the image generating device may generate first distance data based on the distances between the target point within the object and each of the target transmitter and the target receiver.

The target transmitter may indicate the transmitter closest to the virtual transmitter among the plurality of transmitters of the measurement device. And the the target receiver may indicate the receiver closest to the virtual receiver among the plurality of receiver of the measurement device In some embodiments, the target point may be the center of a cross-section of the object corresponding to the target height.

In operation S220, the image generating device may generate second distance data based on the distances between the target point within the object and each of the virtual transmitter and the virtual receiver.

In operation S230, the image generating device may generate the correction data based on a comparison operation of the first distance data and the second distance data.

In some embodiments, the image generating device may be further configured to generate the correction data based on equation $$\frac{e^{-ikL_{VT}} \times e^{-ikL_{VR}}}{e^{-ikL_T} \times e^{-ikL_R}}.$$

In this case, $L_T$ may indicate the first transmitter distance, $L_R$ may indicate the first receiver distance, $L^{VT}$ may indicate the second transmitter distance, and $L_{VR}$ may indicate the second receiver distance.

In operation S240, the image generating device may generate the virtual measurement data based on the product of the measurement data and correction data.

Figure 9:
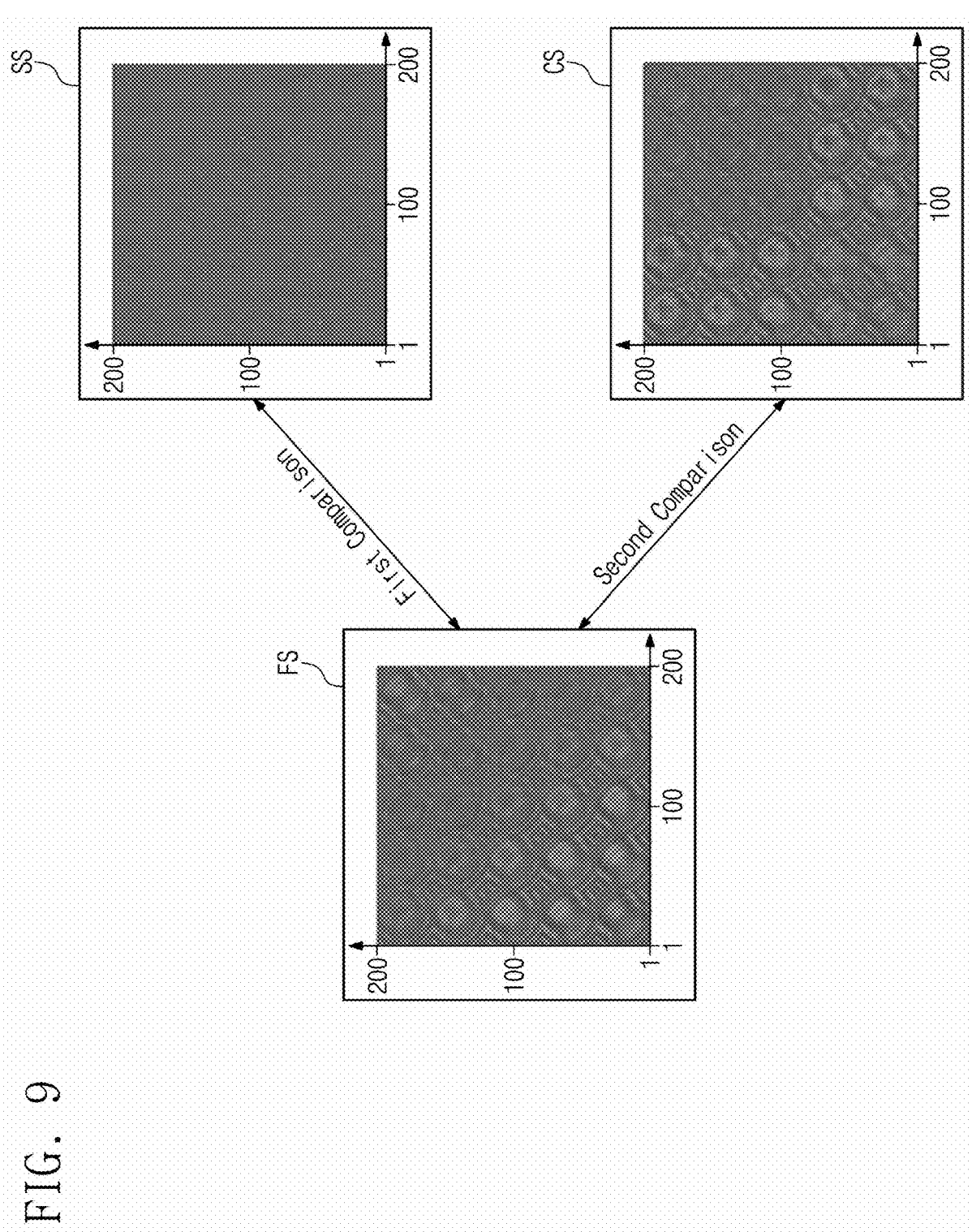
FIG. 9 is a diagram describing S-parameters of an image generating device according to the present disclosure.

FIG. 9 is a diagram describing S-parameters of an image generating device according to the present disclosure. Referring to FIG. 9, the measurement data measured from each of the image generating device including a plurality of transmitters and a plurality of receivers arranged in a full-size arrangement, the image generating device including a plurality of transmitters and a plurality of receivers arranged in a sparse arrangement, and the image generating device according to the present disclosure are illustrated.

In detail, a horizontal axis of FIG. 9 may indicate a plurality of transmitters, and a vertical axis may indicate a plurality of receivers. For example, the horizontal axis may correspond to the first to 200th transmitters, respectively, and the vertical axis may correspond to the first to 200th receivers, respectively. However, the scope of the present disclosure is not limited thereto, the number of transmitter and receivers may be less than or more than 200.

In detail, FIG. 9 may be a diagram illustrating only real portions of S-parameters included in the measurement data. For example, the S-parameters may be measured as complex numbers representing a waveform corresponding to the echo signal. When the real value of the S-parameter is large, it may be displayed in bright color, and when the real value of the S-parameter is small, it may be displayed in dark color.

The plurality of transmitters and the plurality of receivers arranged in the full-size arrangement may generate a full-size S-parameter graph FS. In this case, the number of transmitters may be 200. And the number of receivers may be 200. The full-size S-parameter graph FS appears periodically in bright and dark colors as the phase of the echo signal changes.

However, the plurality of transmitters and the plurality of receivers arranged in the sparse arrangement may generate a sparse arranged S-parameter graph SS. In this case, the plurality of transmitters and the plurality of receivers may include half of the first to 200th transmitters and receivers (i.e., the first to 100th transmitters and receivers). However, the scope of the present disclosure is not limited thereto, and the number of transmitters and receivers may be less than or more than 100 each (however, when the number of transmitters and receivers arranged in a sparse arrangement is less than 200 each). In the sparse array S-parameter graph SS, the measured value of the echo signal appears as 0 in areas where the transmitter or receiver is not placed, so the periodicity between bright and dark areas may not appear.

The image generating device according to the present disclosure includes the plurality of transmitters and the plurality of receivers arranged in a sparse arrangement, but may generate a corrected S-parameter graph CS by amplifying the S-parameter. The corrected S-parameter graph CS has bright and dark parts appearing periodically, similar to the full-size S-parameter graph FS. In detail, the image generating device according to the present disclosure may amplify the S-parameter by setting virtual transmitters and receivers in areas where a plurality of transmitters and a plurality of receivers are not arranged, thereby achieving performance similar to that in which a greater number of transmitters and receivers are arranged.

Figure 10:
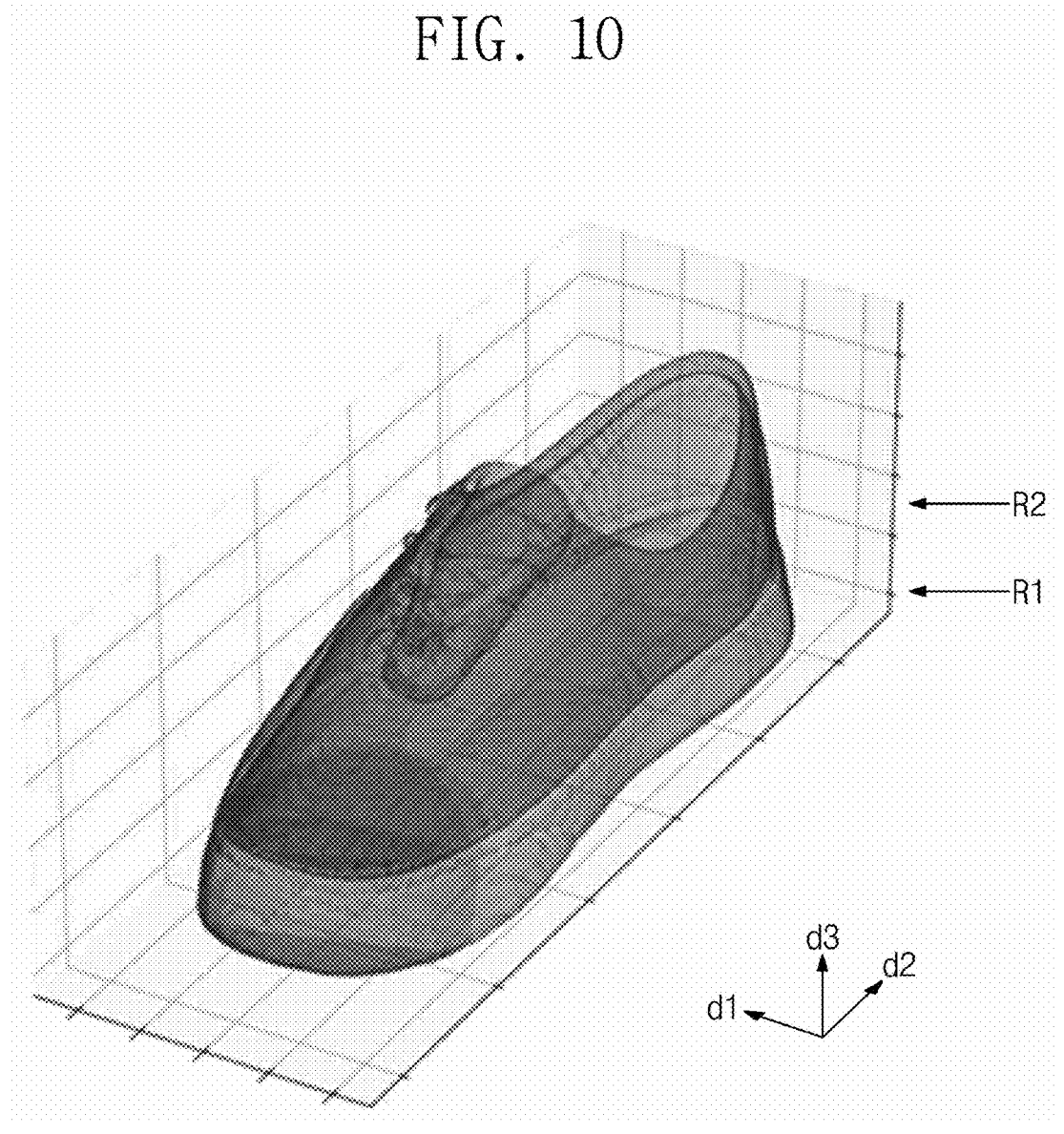
FIG. 10 is a diagram describing an object measured by an image generating device according to the present disclosure.

FIG. 10 is a diagram describing an object measured by an image generating device according to the present disclosure. Referring to FIG. 10, a shoe located in three-dimensional space is illustrated as an example of an object. The first direction d1, the second direction d2, and the third direction d3 of FIG. 10 may correspond to the first direction d1, the second direction d2, and the third direction d3 of FIG. 2, respectively.

Hereinafter, FIGS. 11 to 14 describe restored image signals corresponding to the object of FIG. 10.

Referring to FIGS. 11 to 14, first to fourth full-size images FI1 to F14, first to fourth sparse images SI1 to SI4, and first to fourth restored images RI1 to R14 will be described, respectively.

Each of the first to fourth full-size images FI1 to F14 may indicate an image generated as the restored image signal by the general image generating device including a plurality of transmitters and a plurality of receivers arranged in full-size arrangement.

Each of the first to fourth sparse images SI1 to SI4 may indicate an image generated as the restored image signal by the general image generating device including a plurality of sparsely arranged transmitters and receivers.

Each of the first to fourth restored images RI1 to RI4 may indicate an image generated by the image restorer of the image generating device according to the present disclosure based on the amplified image signal. In this case, the number of the plurality of transmitters and the plurality of receivers of the image generating device according to the present disclosure may be the same as the number of the plurality of transmitters and the plurality of receivers arranged in a sparse arrangement.

Figure 11:
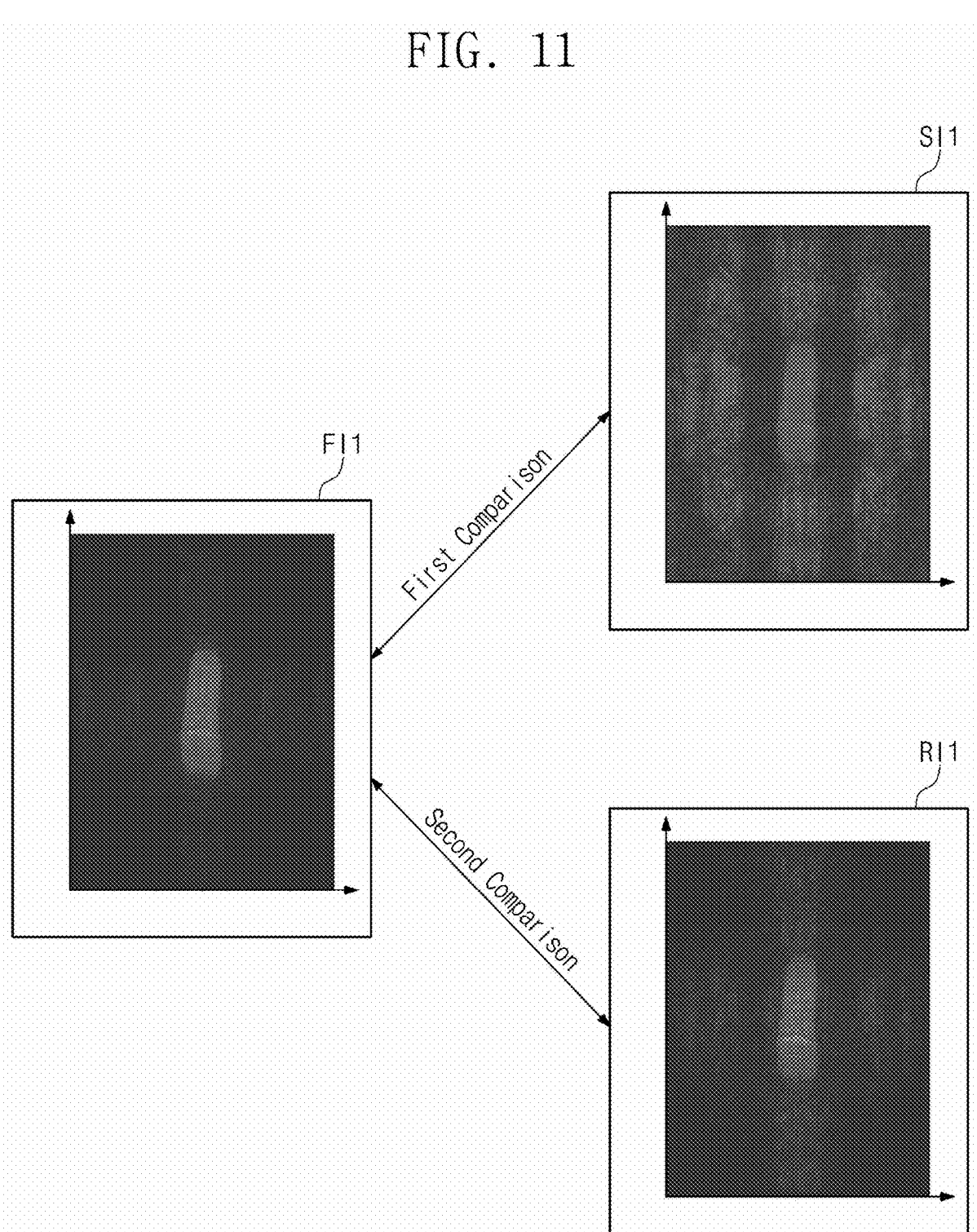
FIG. 11 is a diagram describing restored image signals corresponding to a cross section of an object of FIG. 10 at a first height R1.

FIG. 11 is a diagram describing restored image signals corresponding to a cross section of an object of FIG. 10 at the first height R1. A horizontal axis may indicate the first direction d1 in FIG. 10, and a vertical axis may indicate the second direction d2 in FIG. 10.

The first full-size image FI1 corresponds to the cross section at the first height R1 of the object in FIG. 10. For example, the center of the first full-size image FI1 corresponds to the bottom of the shoe.

The first sparse image SI1 and the first restored image RI1 have more noise and ghost phenomena than the first full-size image FI1.

However, the first restored image RI1 is closer to the first full-size image FI1 than the first sparse image SI1. In detail, noise in the first restored image RI1 is reduced and the ghost phenomenon in the first restored image RI1 is alleviated compared to the first sparse image SI1. Accordingly, the image generating device according to the present disclosure may alleviate noise and ghost phenomena while maintaining the number of transmitters and receivers, or may maintain performance while using fewer transmitters and receivers.

Figure 12:
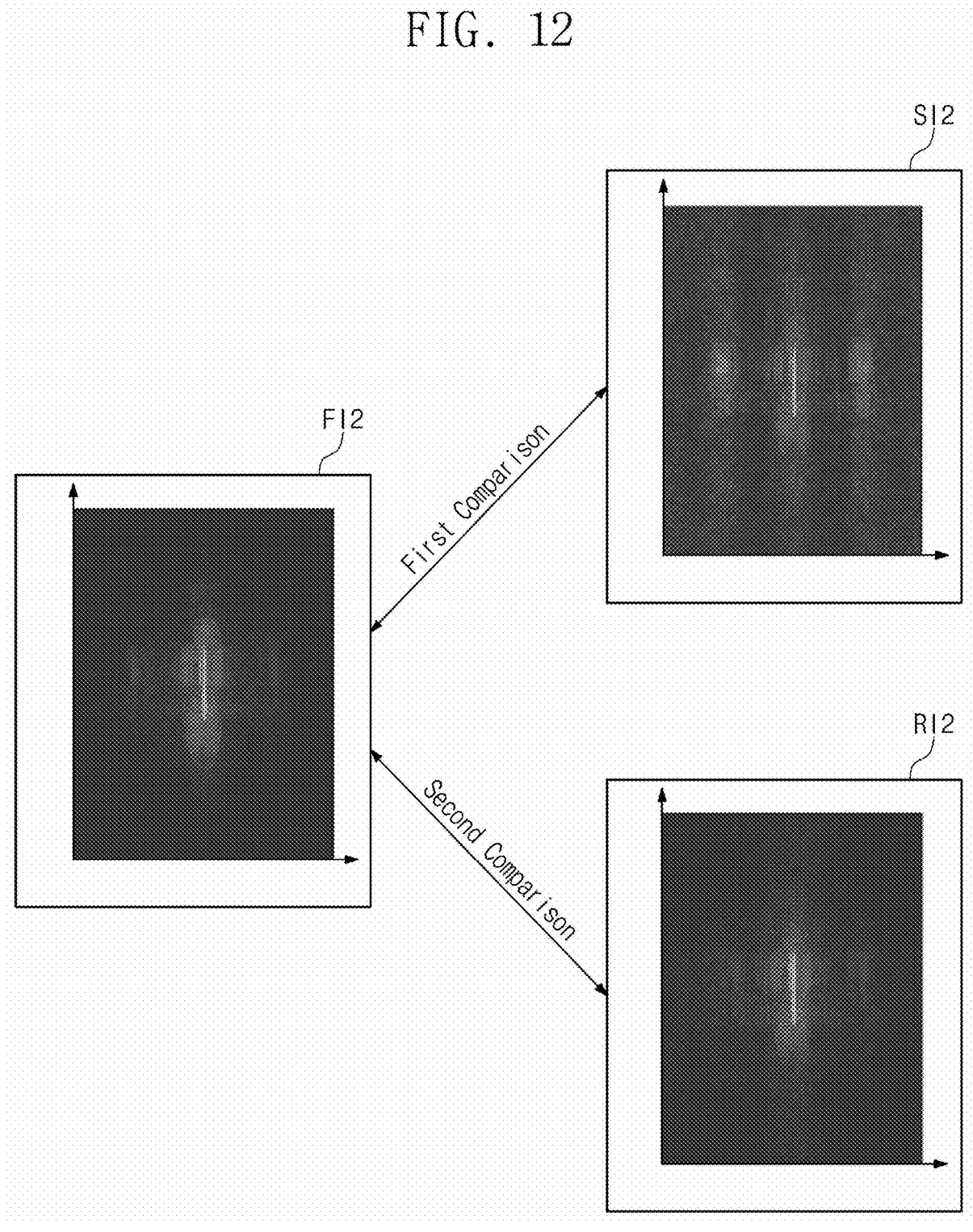
FIG. 12 is a diagram describing restored image signals corresponding to a cross section of an object of FIG. 10 at a second height R2.

FIG. 12 is a diagram describing restored image signals corresponding to a cross section of an object of FIG. 10 at a second height R2. A horizontal axis may indicate the first direction d1 in FIG. 10, and a vertical axis may indicate the second direction d2 in FIG. 10.

A second full-size image FI2 corresponds to the cross section at the second height R2 of the object in FIG. 10. For example, the center of the second full-size image FI2 corresponds to the upper part of the shoe.

A second sparse image S12 and a second restored image RI2 have more noise and ghost phenomena than the second full-size image F12.

However, the second restored image R12 is closer to the second full-size image FI2 than the second sparse image SI2. In detail, noise in the second restored image R12 is reduced and the ghost phenomenon in the second restored image RI2 is alleviated compared to the second sparse image S12.

Figure 13:
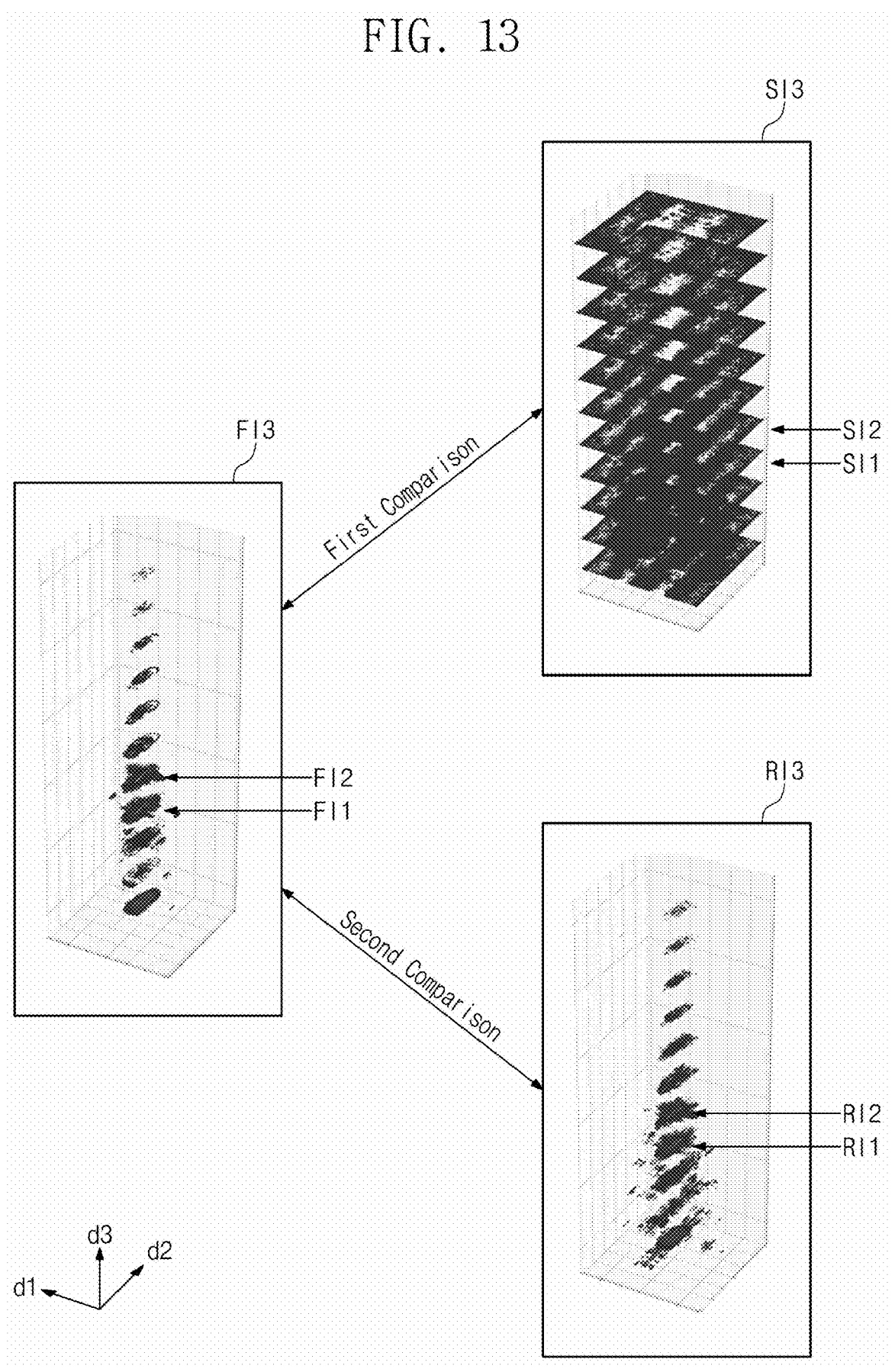
FIG. 13 is a diagram describing a 3D restored image signal of an image generating device according to the present disclosure.

FIG. 13 is a diagram illustrating restored image signals corresponding to cross sections at each of several heights including the first height R1 and the second height R2 of the object of FIG. 10. The first direction d1, the second direction d2, and the third direction d3 of FIG. 13 may correspond to the first direction d1, the second direction d2, and the third direction d3 of FIG. 10, respectively.

A third full-size image FI3, a third sparse image S13, and a third restored image RI3 of FIG. 13 each illustrate several cross-sections according to height in the third direction d3 in three-dimensional space.

The third full-size image FI3 includes images corresponding to cross-sections at each of several heights of the object in FIG. 10. For example, the third full-size image F13 may include image signals corresponding to each of the first full-size image FI1 and the second full-size image FI2.

The third sparse image S13 includes images corresponding to cross-sections at each of several heights of the object in FIG. 10. For example, the third sparse image SI3 may include the first sparse image SI1 and the second sparse image SI2.

The third restored image R13 includes images corresponding to cross-sections at each of several heights of the object in FIG. 10. For example, the third restored image R13 may include the first restored image RI1 and the second restored image RI2.

The third sparse image SI3 and the third restored image R13 have more noise and ghost phenomena than the third full-size image F13.

However, the third restored image RI3 is closer to the third full-size image FI3 than the third sparse image S13. In detail, noise in the third restored image R13 is reduced and the ghost phenomenon in the third restored image RI3 is alleviated compared to the third sparse image S13.

Figure 14:
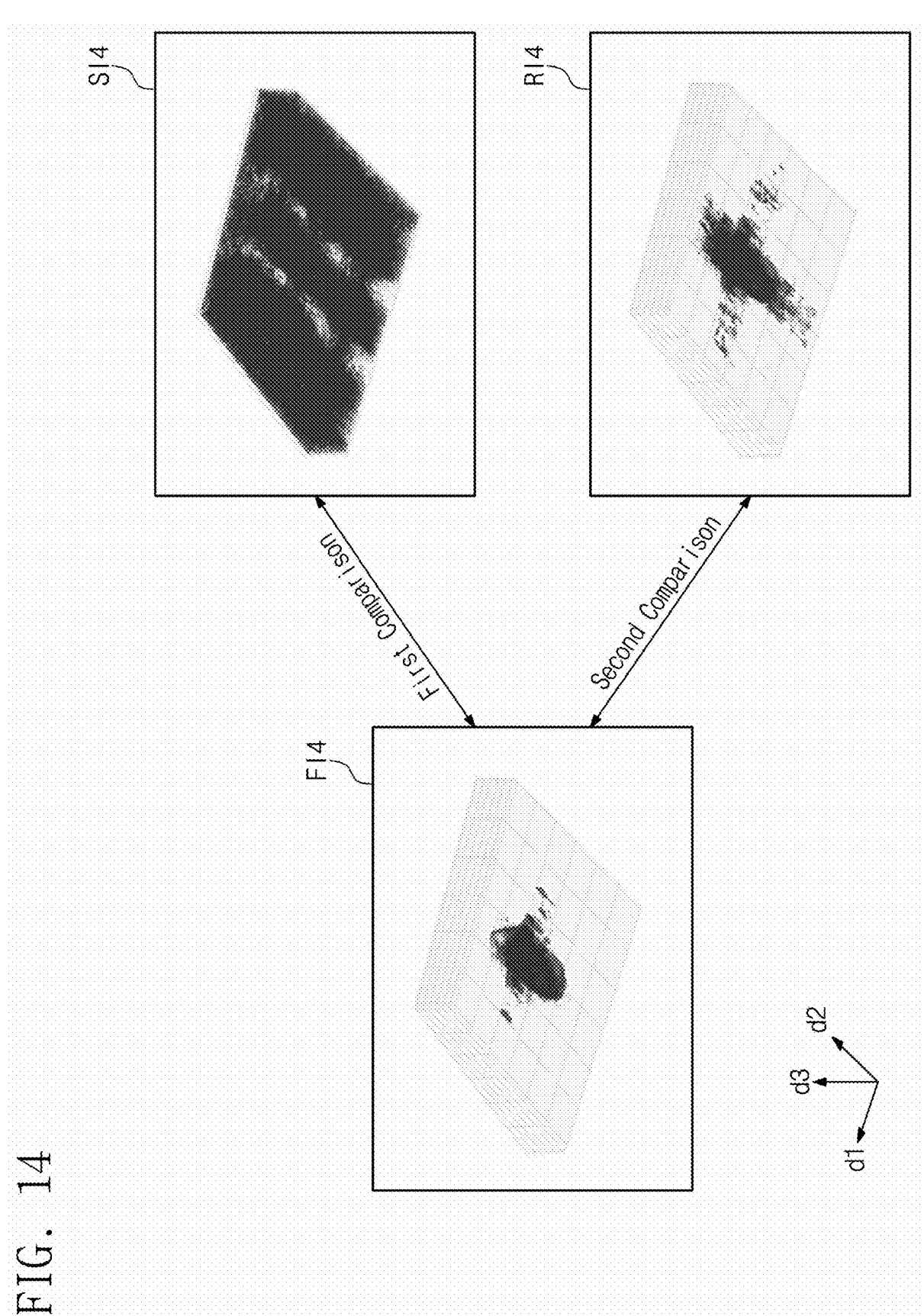
FIG. 14 is a diagram describing a 3D restored image signal of an image generating device according to the present disclosure.

FIG. 14 is a diagram describing a 3D restored image signal corresponding to the object of FIG. 10. The first direction d1, the second direction d2, and the third direction d3 of FIG. 14 may correspond to the first direction d1, the second direction d2, and the third direction d3 of FIG. 10, respectively.

The fourth full-size image FI4, the fourth sparse image S14, and the fourth restored image R14 of FIG. 14 each represent an image corresponding to the object of FIG. 10 in three dimensions.

The fourth full-size image FI4 may refer to the three-dimensional image corresponding to the shoe in FIG. 10.

Similar to FIGS. 11 to 13, the fourth sparse image S14 and the fourth restored image RI4 may generate more noise and ghost phenomena than the fourth full-size image FI4.

However, the fourth restored image R14 is closer to the fourth full-size image FI4 than the fourth sparse image SI4. In detail, noise in the fourth restored image R14 is reduced and the ghost phenomenon in the fourth restored image R12 is alleviated compared to the fourth sparse image S14.

According to an embodiment of the present disclosure, an image generating device and method for setting virtual transmitters and virtual receivers are provided.

In addition, by setting up virtual transmitters and receivers and amplifying the actual measured data based on the virtual transmitters and receivers, an image generating device with improved performance is provided, while having similar performance to using more transmitters and receivers and even while reducing cost or using the same transmitter and receiver.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. Therefore, the scope of the present disclosure should not be limited to the above-described embodiments and should be defined by not only the claims to be described later, but also those equivalents to the claims of the present disclosure.

What is claimed is:

1. An image generating device comprising:
a measurement device including a plurality of transmitters and a plurality of receivers for a multistatic measurement of an object;
an image preprocessing device configured to receive a raw image signal corresponding to the multistatic measurement from the measurement device, and to generate a preprocessed image signal based on the raw image signal;
an image amplifier configured to generate an amplified image signal based on the preprocessed image signal; and
an image restorer configured to generate a restored image signal corresponding to the object based on the amplified image signal, and
wherein the image amplifier is further configured to:
set up a first virtual transmitter and a first virtual receiver;
obtain first measurement data of a first target transmitter closest to the first virtual transmitter among the plurality of transmitters and a first target receiver closest to the first virtual receiver among the plurality of receivers from the preprocessed image signal;
generate first virtual measurement data of the first virtual transmitter and the first virtual receiver based on a first operation of the first measurement data and first correction data; and
generate the amplified image signal based on a synthesis of the preprocessed image signal and the first virtual measurement data.

2. The image generating device of claim 1, wherein the image amplifier is further configured to:
set up a second virtual transmitter and a second virtual receiver;
obtain second measurement data of a second target transmitter closest to the second virtual transmitter among the plurality of transmitters and a second target receiver closest to the second virtual receiver among the plurality of receivers from the preprocessed image signal;
generate second virtual measurement data of the second virtual transmitters and the second virtual receiver based on a second operation of the second measurement data and second correction data; and
generate the amplified image signal based on a synthesis of the preprocessed image signal, the first virtual measurement data, and the second virtual measurement data.

3. The image generating device of claim 1, wherein the image amplifier is further configured to:

generate first distance data based on distances between a target point within the object and each of the first target transmitter and receiver;
generate second distance data based on distances between the target point within the object and each of the first virtual transmitter and receiver;
generate the first correction data based on a comparison operation of the first distance data and the second distance data; and
generate the first virtual measurement data based on a product of the first measurement data and the first correction data, and
wherein the first distance data includes a first transmitter distance indicating a distance between the first target transmitter and the target point, and a first receiver distance indicating a distance between the first target receiver and the target point, and
wherein the second distance data includes a second transmitter distance indicating a distance between the first virtual transmitter and the target point, and a second receiver distance indicating a distance between the first virtual receiver and the target point.

4. The image generating device of claim 3, wherein the target point within the object is a center of a cross section of the object corresponding to a target height.

5. The image generating device of claim 3, wherein the image amplifier is further configured to:
generate the first correction data based on equation $$\frac{e^{-ikL_{VT}} \times e^{-ikL_{VR}}}{e^{-ikL_T} \times e^{-ikL_R}},$$

and where $L_T$ indicates the first transmitter distance, $L_R$ indicates the first receiver distance, $L_{VT}$ indicates the second transmitter distance, and $L_{VR}$ indicates the second receiver distance.

6. The image generating device of claim 1, wherein the measurement device is further configured to generate the raw image signal using a signal of a terahertz wave.

7. The image generating device of claim 6, wherein the plurality of transmitters are arranged at intervals of $\frac{1}{4}^{\overline{\lambda}}$ to 1 $\overline{\lambda}$, the plurality of receivers are arranged at intervals of $\frac{1}{4}^{\overline{\lambda}}$ to $1^{\overline{\lambda}}$, and the $\overline{\lambda}$ is a wavelength of the terahertz wave.

8. The image generating device of claim 1, wherein the image preprocessing device is further configured to remove noise from the raw image signal or to realign the raw image signal.

9. The image generating device of claim 1, wherein the restored image signal is a 3D (3-dimensional) image signal.

10. A method of operating an image generating device including a measurement device, an image preprocessing device, an image amplifier, and an image restorer, the method comprising:
generating, by the measurement device, a raw image signal corresponding to a multistatic measurement of an object;
generating, by the image preprocessing device, a preprocessed image signal based on the raw image signal;
setting up, by the image amplifier, a first virtual transmitter and a first virtual receiver;
obtaining, by the image amplifier, first measurement data of a first target transmitter closest to the first virtual transmitter among a plurality of transmitters of the measurement device and a first target receiver closest to the first virtual receiver among a plurality of receivers of the measurement device from the preprocessed image signal;

generating, by the image amplifier, first virtual measurement data of the first virtual transmitter and the first virtual receiver based on a first operation of the first measurement data and first correction data;

generating, by the image amplifier, an amplified image signal based on a synthesis of the preprocessed image signal and the first virtual measurement data; and generating, by the image restorer, a restored image signal corresponding to the object based on the amplified image signal.

11. The method of claim 10, wherein the setting up, by the image amplifier, of the first virtual transmitter and the first virtual receiver further includes setting up a second virtual transmitter and the second virtual receiver, wherein the obtaining, by the image amplifier, of the first measurement data of the first target transmitter closest to the first virtual transmitter among the plurality of transmitters of the measurement device and the first target receiver closest to the first virtual receiver among the plurality of receivers of the measurement device from the preprocessed image signal further includes obtaining second measurement data of second target transmitter closest to the second virtual transmitter among the plurality of transmitters of the measurement device and second target receiver closest to the second virtual receiver among the plurality of receivers of the measurement device from the preprocessed image signal, wherein the generating, by the image amplifier, of the first virtual measurement data of the first virtual transmitter and the first virtual receiver based on the first operation of the first measurement data and the first correction data further includes generating second virtual measurement data of the second virtual transmitter and the second virtual receive based on a second operation of the second measurement data and second correction data, and wherein the generating, by the image amplifier, of the amplified image signal based on the synthesis of the preprocessed image signal and the first virtual measurement data includes:

generating a first synthesis image signal based on the synthesis of the preprocessed image signal and the first virtual measurement data;

generating a second synthesis image signal based on a synthesis of the first synthesis image signal and the second virtual measurement data; and providing the second synthesis image signal as the amplified image signal to the image restorer.

12. The method of claim 10, wherein the generating, by the image amplifier, of the virtual measurement data of the first virtual transmitter and the first virtual receive based on the first operation of the first measurement data and the first correction data includes:

generating first distance data based on distances between a target point within the object and each of the first target transmitter and the first target receiver;

generating second distance data based on distances between the target point within the object and each of the first virtual transmitter and the first virtual receiver;

generating the first correction data based on a comparison operation of the first distance data and the second distance data; and generating the first virtual measurement data based on a product of the first measurement data and the first correction data, and wherein the first distance data includes a first transmitter distance indicating a distance between the first target transmitter and the target point, and a first receiver distance indicating a distance between the first target receiver and the target point, and wherein the second distance data includes a second transmitter distance indicating a distance between the first virtual transmitter and the target point, and a second receiver distance indicating a distance between the first virtual receiver and the target point.

13. The method of claim 12, wherein the target point of the object is a center of a cross section of the object corresponding to a target height.

14. The method of claim 12, wherein the comparison operation indicates equation $$\frac{e^{-ikL_{VT}} \times e^{-ikL_{VR}}}{e^{-ikL_{T}} \times e^{-ikL_{R}}},$$

and where $L_T$ indicates the first transmitter distance, $L_R$ indicates the first receiver distance, $L_{VT}$ indicates the second transmitter distance, and $L_{VR}$ indicates the second receiver distance.

15. The method of claim 10, wherein the generating, by the measurement device, of the raw image signal corresponding to the multistatic measurement of the object includes:

providing, by a plurality of transmitters of the measurement device, a signal of a terahertz wave to the object;

receiving, by a plurality of receivers of the measurement device, an echo signal corresponding to the signal of the terahertz wave from the object; and generating the raw image signal based on the signal of the terahertz wave and the echo signal.

* * * * *